US009166289B2

(12) United States Patent
Donaldson (10) Patent No.: US 9,166,289 B2
(45) Date of Patent: Oct. 20, 2015

(54) APPARATUS AND METHOD FOR DETERMINING RELATIVE DIRECTION OF A WIRELESS PEER DEVICE FROM ANOTHER DEVICE

(75) Inventor: Thomas A. Donaldson, London (GB)

(73) Assignee: AliphCom, San Francisco, CA (US)

( * ) Notice: Subject to any disclaimer, the term of this patent is extended or adjusted under 35 U.S.C. 154(b) by 0 days.

(21) Appl. No.: 13/421,576

(22) Filed: Mar. 15, 2012

(65) Prior Publication Data

US 2012/0238288 A1 Sep. 20, 2012

Related U.S. Application Data

(60) Provisional application No. 61/453,435, filed on Mar. 16, 2011.

(51) Int. Cl.
*H04W 24/00* (2009.01)
*H01Q 3/26* (2006.01)
*H01Q 21/06* (2006.01)
*G01S 3/20* (2006.01)
*H04W 16/28* (2009.01)

(52) U.S. Cl.
CPC ........... *H01Q 3/2611* (2013.01); *G01S 3/20* (2013.01); *H01Q 21/061* (2013.01); *H04W 16/28* (2013.01)

(58) Field of Classification Search
CPC ....... H04W 16/28; H04W 64/00; H04W 4/02; H04W 64/003; H04W 4/023; H04W 4/021; H04W 4/025; H04W 4/028; H04W 4/04; H04W 36/32; H04W 40/20; H04M 1/72572
USPC ...................................................... 455/456.1
See application file for complete search history.

(56) References Cited

U.S. PATENT DOCUMENTS

| 4,495,504 | A | 1/1985 | Archer et al. |
|---|---|---|---|
| 6,034,636 | A * | 3/2000 | Saitoh .................... 343/700 MS |
| 6,218,986 | B1 * | 4/2001 | Yukitomo et al. ............ 342/372 |
| 7,206,609 | B2 | 4/2007 | Lin et al. |
| 7,400,606 | B2 * | 7/2008 | Padovani et al. .............. 370/335 |
| 8,217,843 | B2 * | 7/2012 | Shtrom et al. ................ 343/702 |
| 2005/0245286 | A1 * | 11/2005 | Lin et al. .................... 455/562.1 |
| 2007/0142061 | A1 * | 6/2007 | Taubenheim et al. ....... 455/456.2 |
| 2007/0222697 | A1 * | 9/2007 | Caimi et al. .................. 343/861 |
| 2007/0287399 | A1 * | 12/2007 | Lee ............................. 455/226.2 |
| 2009/0273520 | A1 * | 11/2009 | Shao et al. .................... 342/417 |
| 2009/0279512 | A1 * | 11/2009 | Fujishima et al. ............ 370/336 |
| 2009/0296563 | A1 * | 12/2009 | Kishiyama et al. ........... 370/210 |
| 2010/0098181 | A1 * | 4/2010 | Jacobsen et al. .............. 375/260 |
| 2011/0025566 | A1 * | 2/2011 | Suh et al. ..................... 343/702 |

OTHER PUBLICATIONS

Copenheaver, Blaine R., Written Opinion of the International Search Authority and International Search Report, International Application No. PCT/US2012/029541, Mailing date Oct. 30, 2013.

* cited by examiner

*Primary Examiner* — Liton Miah
(74) *Attorney, Agent, or Firm* — Kokka & Backus, PC (57) ABSTRACT

Systems, apparatuses, devices, and methods for wireless communications. An antenna in which nulls or directions of reduced performance can be selectively introduced is provided, and the performance of a communication link to a wireless communication device is monitored. By correlating the selectively reduced sensitivity of the antenna with reductions in the communication link performance, the direction of the wireless communication device may be estimated. Embodiments of the present invention may be used in numerous applications, such as cell phones, PDA's, and laptops.

20 Claims, 7 Drawing Sheets

APPARATUS AND METHOD FOR DETERMINING RELATIVE DIRECTION OF A WIRELESS PEER DEVICE FROM ANOTHER DEVICE

CROSS-REFERENCES TO RELATED APPLICATIONS

This application claims the benefit of U.S. Provisional Application No. 61/453,435 entitled "Wireless Peer Source Direction Tracking" filed on Mar. 16, 2011, the entire disclosure of which is hereby incorporated herein by reference.

BACKGROUND

Embodiments of the invention are directed to systems, apparatuses, and methods for using and operating communications devices, and more specifically to the use and operation of wireless communication devices where one or more of the devices may be moveable. In some embodiments, the invention may be used in situations where the moveable part of a wireless communication link may change location during an active connection. For example, the invention may be utilized in a situation in which a Bluetooth-enabled headset is communicating with a Bluetooth-enabled cell phone, and the headset is moving relative to the cell phone during a communication session (which may arise for example, in a situation where a user walks around an office while their cell phone is left on a desk).

In some situations it may be desirable to be able to determine the approximate direction in which a wireless peer device is located relative to a known object. For example, in the case where a cell phone user has misplaced their headset, it would be beneficial to determine in which direction (relative to the cell phone) that the headset was situated, in order to enable the user to retrieve the headset. As another example, where a headset is involved in a pairing operation with another device in a field of multiple devices, it may be more efficient to allow the user to point their headset in the direction of the desired peer device in order to facilitate identification of the device with which the user desires to conduct a pairing operation. As another example, a game or activity where different users challenge each other to perform a task may include the capability to allow users to challenge players in their vicinity that may not be known to them. In this situation, it would be helpful to facilitate a user finding another user by pointing out the direction in which the other user is located. These examples and other use cases represent some of the applications in which the ability to determine the approximate relative direction of a wireless peer device from another device would be beneficial.

A number of conventional methods exist for performing direction-finding operations. For example, each portable device could be equipped with a compass, a GPS receiver, and a connection to a server, and they could share their current position and direction with the server. The relative direction could then be determined from the information on the server. However, this method has a number of serious drawbacks. These drawbacks include the additional cost of a compass and GPS receiver, the reliance on the existence of a GPS system and a dependable network connection, the additional power consumption, and a potentially excessive latency in determining the desired information.

Another conventional method that is at least theoretically feasible involves using a radio-frequency beam-former, or steerable antenna, which enables antenna performance to be optimized for a particular direction. The antenna beam is rotated to determine the direction of the peer by detecting the direction of the strongest received signal. However, this technique also has a number of limitations. It is typically costly, relatively large, and consumes an excessive amount of power for many applications. Further, when not used for direction-finding, the antenna pattern is typically very inefficient unless it can be continually trained on the peer device, which is usually difficult to achieve.

As a result, it would be desirable to have a means of discovering the relative direction of a wireless communication device with respect to another device, where such means overcomes one or more of the disadvantages of conventional approaches. Such a system, device, or method may provide one or more of the advantages of reduced cost, reduced size, reduced power consumption, reduced complexity, improved antenna performance, or reduced latency compared to conventional approaches.

What is desired are a system, apparatus, and method for determining the approximate direction in which a peer device lies relative to another device, where such system, apparatus, or method may have one or more of the benefits of lower cost, smaller size, reduced power consumption, lower computational complexity, reduced number of components, improved antenna performance, or lower latency when compared to conventional approaches. Embodiments of the invention provide these and other benefits either individually or collectively.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are directed to systems, apparatuses, and methods for using and operating communications devices, and more specifically to the use and operation of wireless communication devices where one or more of the involved devices may be moveable. In some embodiments, the invention may be used in situations where the moveable part of a wireless communication link may change location during an active connection. For example, the invention may be utilized in a situation in which a Bluetooth-enabled headset is communicating with a Bluetooth-enabled cell phone, and the headset is moving relative to the cell phone during a communication session.

In some embodiments, an antenna or antenna system is provided with a capability to selectively introduce nulls or directions of reduced performance (e.g., sensitivity) into a radiation pattern associated with the antenna, and the performance of a communication link (i.e., a connection over a communications network) to a wireless communication device is monitored. By correlating one or more selectively introduced reductions in the performance of the antenna with a corresponding reduction in the communication link quality/performance (e.g., as measured by a suitable parameter), the direction of the wireless communication device may be estimated. This information may be used to infer the relative location or position of a device, to assist in performing a pairing operation in a more efficient manner. Embodiments of the present invention may be used in numerous applications and devices, such as cell phones, PDA's, laptop computers, and other types of computing or communication devices.

In one embodiment, the invention is directed to a system, where the system includes:

an antenna having an associated radiation pattern;

a means for selectively introducing a null or other reduction in sensitivity into the radiation pattern in a desired direction;

a means for monitoring the performance of a wireless communication link between a first device associated with the antenna and a second device, the first device and the second device communicating with each other using the wireless communication link; and a means for correlating a reduction in the performance of the wireless communication link with the selectively introduced null or reduction in sensitivity, thereby providing an estimate of the direction of the second device relative to the first device.

In another embodiment, the invention is directed to a method of determining a direction of a second device relative to a first device, where the method includes:

operating the first device so as to receive signals using an antenna having a radiation pattern;

selectively introducing a null or other form of reduced sensitivity into the radiation pattern in a desired direction;

monitoring the performance of a wireless communication link between the first device the second device, the first device and the second device communicating with each other using the wireless communication link; and correlating a reduction in the performance of the wireless communication link with the selectively introduced null or other form of reduced sensitivity, thereby providing an estimate of the direction of the second device relative to the first device.

In yet another embodiment, the invention is directed to a mobile device operable to communicate with a second device using a wireless communications technology, comprising:

an antenna having an associated radiation pattern for receiving signals provided to the mobile device using the wireless communications technology;

a receiver coupled to the antenna for detecting the received signals;

an antenna configuration module for selectively altering an aspect of the associated radiation pattern of the antenna to cause a reduction in the performance of the antenna;

a communications link monitoring module for monitoring a signal characteristic of a signal exchanged between the second device and the mobile device; and a correlation module for determining a correlation between a change in the signal characteristic and the selectively altered aspect of the radiation pattern of the antenna, thereby providing an estimate of the direction of the second device relative to the mobile device.

Other objects and advantages of the present invention will be apparent to one of ordinary skill in the art upon review of the detailed description of the present invention and the included figures.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some embodiments, the invention may include one or more of the following elements: a communications device that includes an antenna system (e.g., an omni-directional antenna system) that is capable of being operated in a manner that permits the selective introduction of a null or direction of reduced performance (e.g., sensitivity) in the antenna pattern; an element operable to monitor the performance of a communication link between the communications device and a wireless communication peer device (as determined by evaluation or measurement of a specified parameter); and an element operable to correlate a reduction in the performance of the communication link with the introduced null or direction of reduced performance in order to provide an estimate of the direction of the communication peer relative to the communications device.

In some embodiments, the invention may include one or more of the following operations or processes: selectively reducing the performance of an antenna system in a particular direction (e.g., by introducing a null or reduction in performance in a region of the antenna pattern); and correlating a reduction in the performance of a communications link with the reduction in the performance of the antenna system in order to provide an estimate of the direction of a communication peer relative to a communications device that includes the antenna system.

One or more example embodiments of the invention will now be described with reference to the figures.

Figure 1:
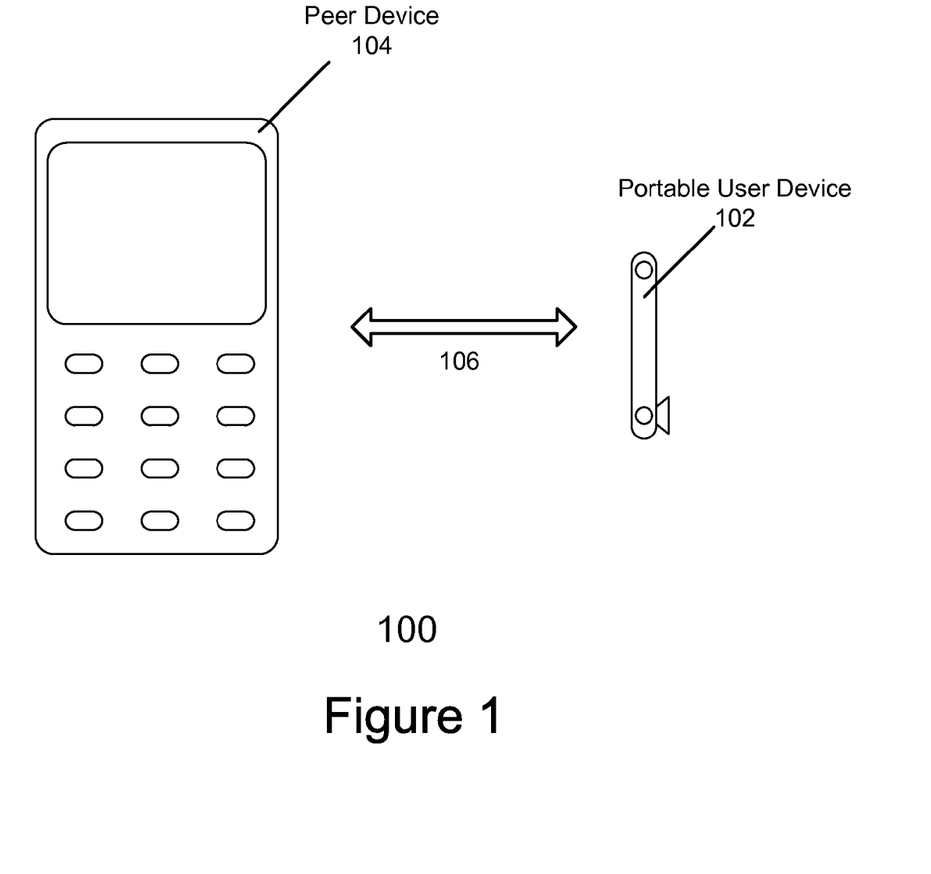
FIG. 1 is a diagram illustrating an exemplary wireless communication system that includes a portable user device and a peer device, and which may be used in implementing an embodiment of the invention.

FIG. 1 is a diagram illustrating an exemplary wireless communication system 100 that includes a portable user device 102 and a peer device 104, and which may be used in implementing an embodiment of the invention. As shown in the figure, a peer device 104 (e.g., a Bluetooth-enabled cell phone) is operable to communicate with a portable user device 102 (e.g., a Bluetooth headset). The two components or elements may communicate with each other by establishing a communications link 106 (representing a connection, transport channel, or other form of relationship that functions to permit the exchange of signals representing data or information between the two devices). In one example scenario or use case, it is assumed that a user has misplaced their portable user device (e.g., Bluetooth headset) 102 and wishes to locate it. In such a situation, they may use a cell phone, wireless communication device, or other form of peer device 104 which incorporates elements of the invention to assist them in this process. Note that in the description that follows, certain standard functions or operational capabilities of a cell phone or wireless communication device may be assumed and may therefore not be described in detail or illustrated. Such standard functions or operational capabilities may include, for example, a display screen, a microprocessor or other electronic computing or processing element capable of executing a set of instructions, a battery or other source of power, an operating system, a user interface or other software application that receives input from a user and provides output such as a tone or display on a display screen, etc.

Note that although in this example use case or usage scenario peer device 104 is a Bluetooth-enabled cell phone, other types of peer devices may be used in embodiments of the invention. For example, peer device 104 may be a personal computer (desktop, laptop, or tablet), a wireless phone other than a cell phone, a desk phone, a general device capable of wireless communication, etc. Similarly, although in this example use case or usage scenario personal user device 102 is a Bluetooth-enabled headset, other types of personal user devices may be used in embodiments of the invention. For example, personal user device 102 may be a personal computer (desktop, laptop, or tablet), a wireless phone other than a cell phone, a desk phone, etc.

Figure 2:
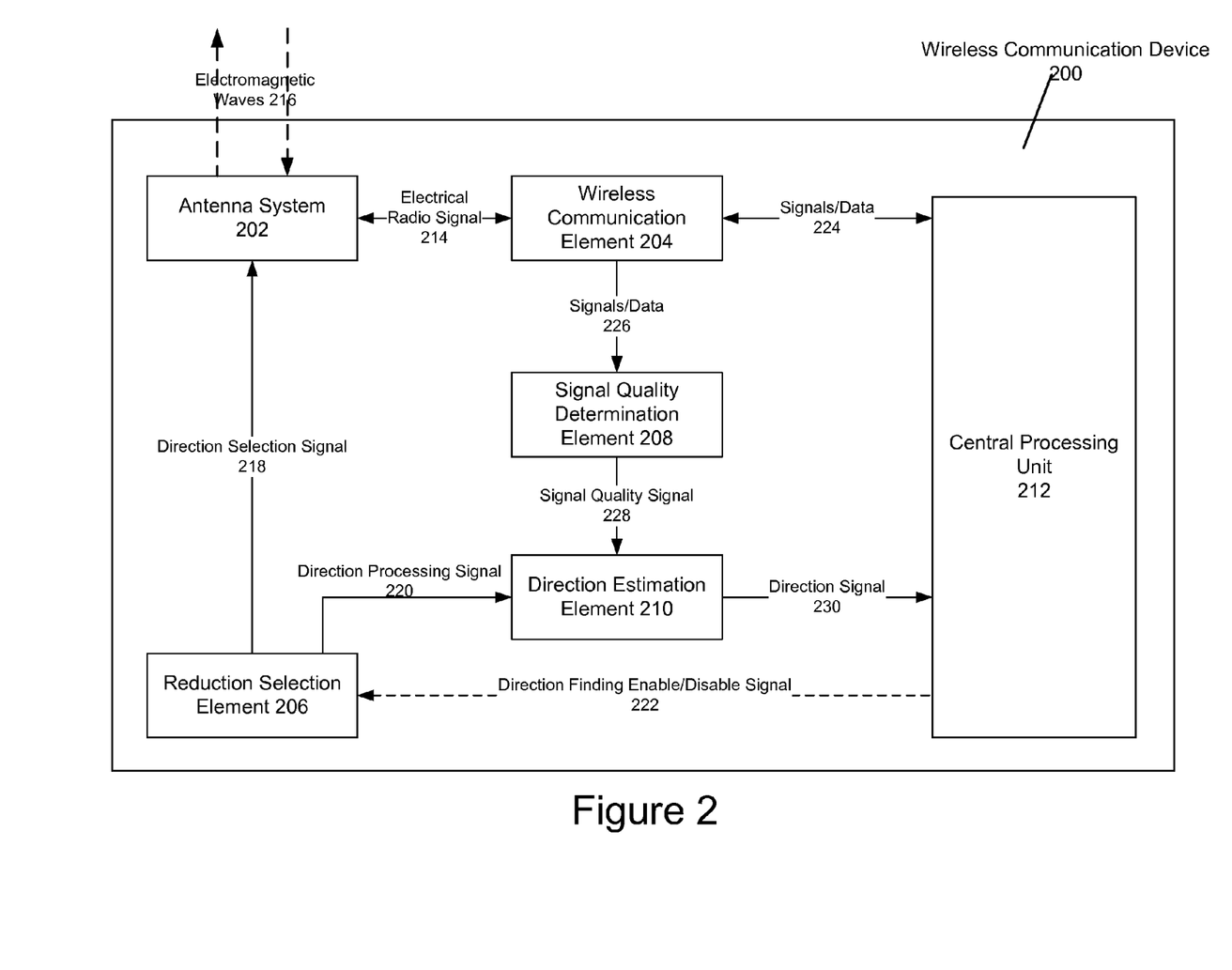
FIG. 2 is a diagram illustrating exemplary components of a wireless communication device that may be used in implementing an embodiment of the invention.

FIG. 2 is a diagram illustrating exemplary components of a wireless communication device 200 that may be used in implementing an embodiment of the invention. In general, wireless communication device 200 may be any suitable device that is capable of wireless communication with another device. In some embodiments, wireless communication device 200 may be a peer device in communication with a portable user device; in other embodiments, wireless communication device 200 may be a portable user device in communication with a peer device.

Wireless communication device 200 may include an antenna system 202, a wireless communication element 204 (which may operate to perform some or all of the functions of a transmitter, receiver, etc.), a reduction selection element 206, a signal quality determination element 208, a direction estimation element 210, and a central processing unit 212. Wireless communication device 200 may also include additional components that are typically standard in a wireless communication device, such as a data storage device, cache memory, etc. which are not shown in the figure.

Antenna system 202 operates to transduce (or otherwise convert) an electrical radio signal 214 provided by wireless communication element 204 into electromagnetic waves 216 for transmission from wireless communication device 200, and to transduce (or otherwise convert) electromagnetic waves 216 communicated to wireless communication device 200 into an electrical radio signal 214 for provision to wireless communication element 204. Antenna system 202 is further operable to receive a direction selection signal 218 from reduction selection element 206, the function and operation of which will be described in greater detail.

Reduction selection element 206 is operable to select or determine certain changes to the operation or configuration of antenna system 202, where such changes have the effect of selectively reducing the efficiency (e.g., the sensitivity or another measure of antenna performance) of the antenna system in one or more directions. Thus, reduction selection element 206 functions to alter the configuration of antenna system 202 and hence it's associated radiation pattern. The result of the operation of reduction selection element 206 is to generate direction selection signal 218, with that signal (in some embodiments) causing a change in the operation of antenna system 202. The change to the operation of antenna system 202 may cause the antenna pattern (which is related to the directionality and sensitivity of an antenna that is part of the system) associated with antenna system 202 to become more or less sensitive in a certain direction or directions. This is typically done by causing one or more "lobes" of the antenna pattern to increase or decrease. Reduction selection element 206 may also operate to provide a direction processing signal 220 to direction estimation element 210 to facilitate one or more operations or processes used to provide an estimate of the direction in which a device is situated. Reduction selection element 206 may receive as an input direction finding enable/disable signal 222 from central processing unit 212, with such a signal (in some embodiments) operating to cause reduction selection element 206 to activate or deactivate.

Wireless communication element 204 operates to enable the reception and transmission of signals and data between wireless communication device 200 and another wireless communication device (e.g., a peer device if the components depicted in FIG. 2 are implemented in a personal user device such as a mobile phone and the "peer" device is a headset). For example, wireless communication element 204 may enable communication with another wireless communication device via antenna system 202, and may exchange signals and/or data with central processing unit 212 (as indicated by the element labeled "Signals/Data 224" in the figure).

Wireless communication element 204 may also exchange signals and/or data with signal quality determination element 208 (as indicated by the element labeled "Signals/Data 226" in the figure). Signal quality determination element 208 may be internal to or external from wireless communication device 200. Signal quality determination element 208 is operable to estimate the strength of a signal provided to the other wireless communication device (e.g., the peer device), as will be described in greater detail. Signal quality determination element 208 typically has as an input one or more signals and/or data provided by wireless communication element 204, where such signals/data typically include one or more of a radio frequency signal or a demodulated signal, and provides as an output a signal quality signal 228. Signal quality signal 228 is a signal that varies approximately with the strength of signal received from the other wireless communication device (e.g., signal quality signal 228 may correspond to the received signal strength, a signal-to-noise ratio, the bit-error-rate, etc. received from a device external to device 200), as will be described in greater detail.

Direction estimation element 210 is operable to estimate the direction in which the other wireless communication device (e.g., the peer device) is situated. Direction estimation element 210 may have as inputs direction processing signal 220 and signal quality signal 228. Direction estimation element 210 operates to provide direction signal 230 as an output, with that signal being processed by central processing unit 212 to provide an estimate of the direction in which the other wireless communication device is located.

A description of an exemplary operation of an embodiment of the invention will now be described; in the following description, wireless communication element 204 of FIG. 2 implements a Bluetooth wireless networking protocol.

Figure 3:
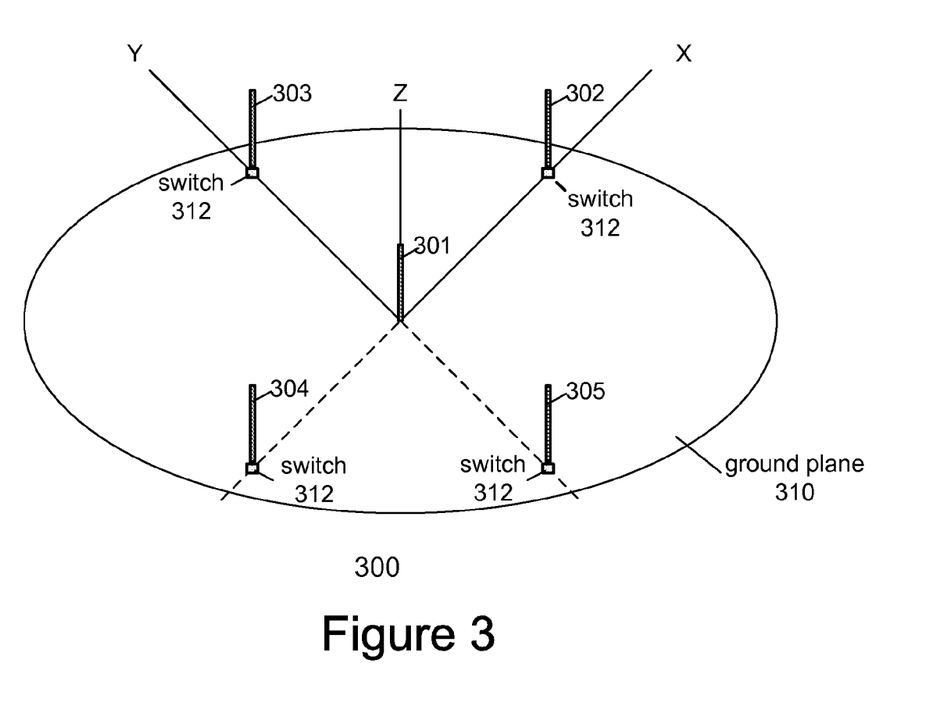
FIG. 3 is a diagram illustrating an exemplary antenna system that may be used in implementing an embodiment of the invention.

FIG. 3 is a diagram illustrating an exemplary antenna system 300 that may be used in implementing an embodiment of the invention. Antenna system 300 may be implemented as part of a wireless communication device, such as a peer device or a personal user device. In some embodiments, antenna system 300 includes a ground-plane 310, to which is electrically connected (at a position to be set as the origin of a co-ordinate system) a straight wire 301 having a length equal to one-quarter wavelength of the frequency of the radio-frequency system. Wire 301 (or another suitable electrical conductor) is oriented substantially perpendicular to ground plane 310. For a Bluetooth wireless communication system, wire 301 is approximately 30 mm long. Such an antenna system as described so far with reference to FIG. 3 is known as a monopole antenna system.

The monopole may be driven by a connection to the wireless communication element of FIG. 2 somewhere along its length (for example, approximately a quarter of the length from the ground-plane). In addition to the monopole antenna system (comprising a ground plane and proper length conductor), embodiments of the invention include an additional number (where four are shown in the embodiment depicted in FIG. 3) of quarter-wavelength long straight wires or other suitable electrical conductor (labeled elements 302, 303, 304, and 305 in the figure). Each of elements 302, 303, 304, and 305 are substantially perpendicular to ground plane 310, and are arranged substantially equidistant around a circle approximately one-quarter wavelength in radius from the origin along the ground plane. The base of each of elements 302, 303, 304, and 305 is electrically connected to ground plane 310 by the operation of a switch element 312, for example a FET transistor. This allows each of the conducting elements (302, 303, 304, and 305) to be grounded or left electrically unconnected depending on whether switch 312 is conducting or not.

Figure 4:
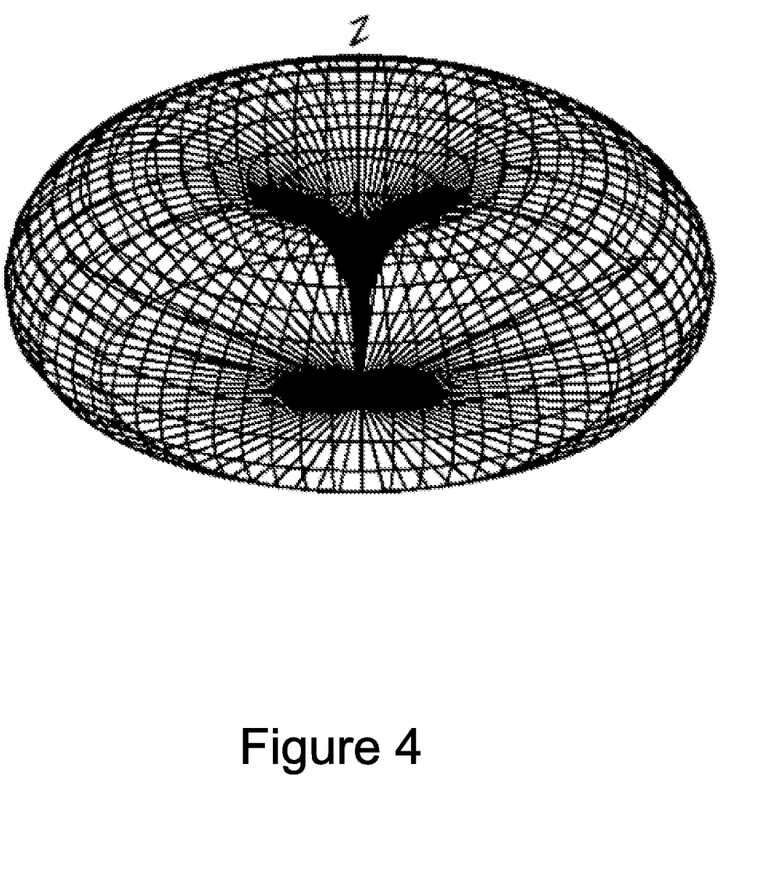
FIG. 4 is a diagram illustrating an example radiation pattern for the antenna system depicted in FIG. 3 when none of the additional conductors (i.e., elements 302, 303, 304, and 305) are connected to the ground plane.

FIG. 4 is a diagram illustrating an example radiation pattern for the antenna system depicted in FIG. 3 when none of the additional conductors (i.e., elements 302, 303, 304, and 305) are connected to the ground plane. For example, each switch 312 may be in a position to leave their corresponding conductor unconnected to ground plane 310 (i.e., none of the transistors are conducting). As shown in FIG. 4, in such a situation the antenna radiation pattern (and equivalently, the antenna sensitivity) is broadly uniform or substantially constant with respect to direction around the z-axis. Such an antenna pattern may be termed "omni-directional" (i.e., the antenna radiates power uniformly around one axis).

Figure 5A:
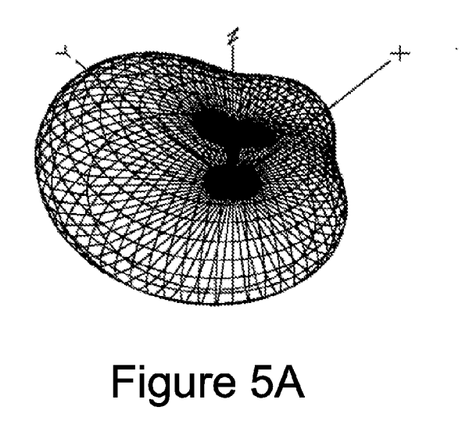
FIG. 5A is a diagram illustrating an example radiation pattern for the antenna system depicted in FIG. 3 when additional conductor 302 is connected to the ground plane.
Figure 5B:
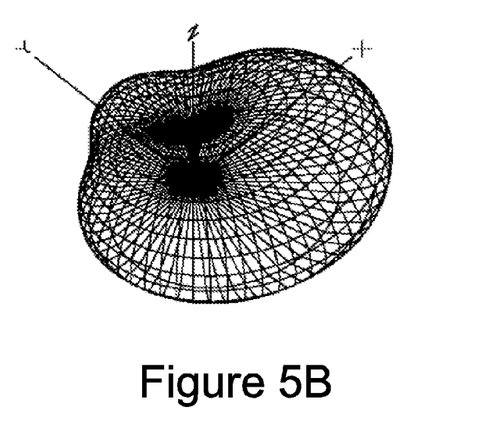
FIG. 5B is a diagram illustrating an example radiation pattern for the antenna system depicted in FIG. 3 when additional conductor 303 is connected to the ground plane.
Figure 5C:
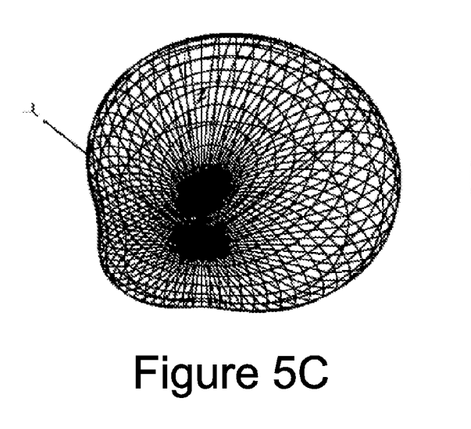
FIG. 5C is a diagram illustrating an example radiation pattern for the antenna system depicted in FIG. 3 when additional conductor 304 is connected to the ground plane.
Figure 5D:
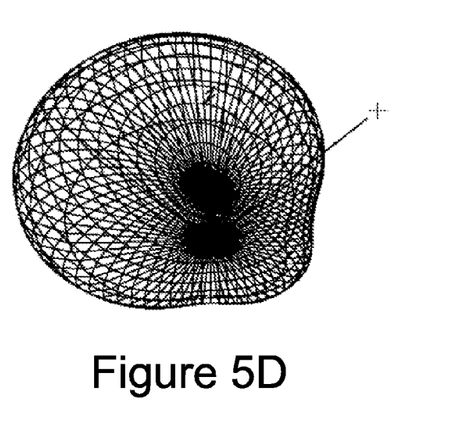
FIG. 5D is a diagram illustrating an example radiation pattern for the antenna system depicted in FIG. 3 when additional conductor 305 is connected to the ground plane.

FIGS. 5A, 5B, 5C, and 5D illustrate the antenna radiation pattern for the antenna system of FIG. 3 when the switch connecting one of the additional conductors is set to electrically conduct. FIG. 5A is a diagram illustrating an example radiation pattern for the antenna system depicted in FIG. 3 when additional conductor 302 is connected to the ground plane. FIG. 5B is a diagram illustrating an example radiation pattern for the antenna system depicted in FIG. 3 when additional conductor 303 is connected to the ground plane. FIG. 5C is a diagram illustrating an example radiation pattern for the antenna system depicted in FIG. 3 when additional conductor 304 is connected to the ground plane. FIG. 5D is a diagram illustrating an example radiation pattern for the antenna system depicted in FIG. 3 when additional conductor 305 is connected to the ground plane. As shown in the figures, when a switch connects one of the additional conductors to the ground plane (e.g., a transistor is set to conduct), the radiation pattern (and equivalently the sensitivity) of the antenna is reduced in the direction of the conductor that is connected to the ground plane.

Figure 6:
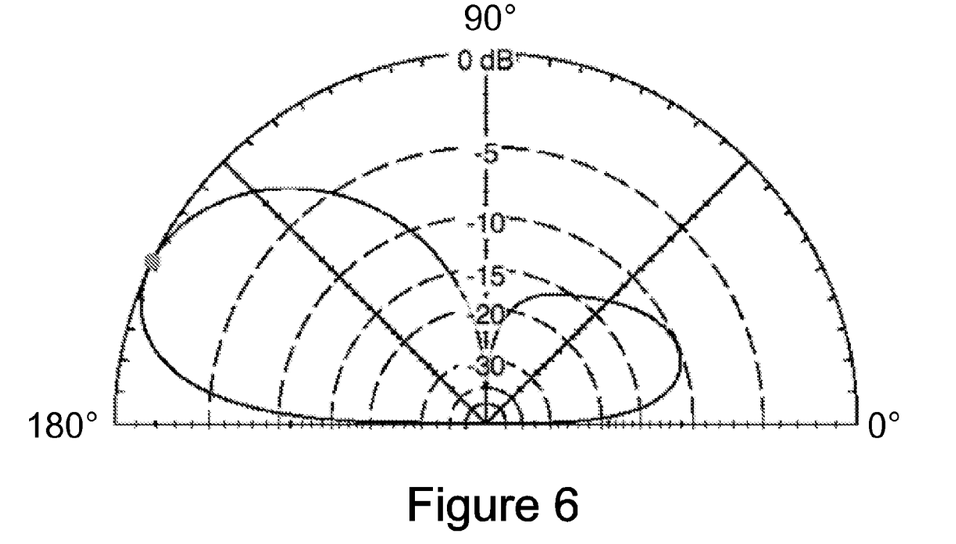
FIG. 6 is a diagram illustrating the signal loss that may be seen for each of the nulls in the antenna pattern depicted in FIGS. 5A through 5D.

FIG. 6 is a diagram illustrating the signal loss that may be seen for each of the nulls in the antenna pattern depicted in FIGS. 5A through 5D. Specifically, FIG. 6 shows the cross-section of an antenna radiation pattern illustrated in each of FIGS. 5A through 5D, where 0 degrees in FIG. 6 corresponds to the positive Z-axis illustrated in FIGS. 5A through 5D. In this embodiment, the sensitivity of the antenna system to a signal originating from the direction in which the sensitivity is reduced is approximately 10 dB lower that from the opposite direction (and from other directions).

Accordingly, in this embodiment of the invention, the performance of the antenna system may be reduced by approximately 10 dB in one direction by making the appropriate switch connect an additional conductor to the ground plane. In the case that the switch is a transistor this can be accomplished by applying the appropriate voltage to the transistor gate. Thus, in this embodiment of the invention, the antenna system includes a substantially omni-directional antenna that can be selectively desensitized (i.e., reduced in signal detection capability) in a chosen direction or directions.

In one embodiment of the invention, when direction finding enable/disable signal 222 of FIG. 2 is set to disable the direction finding capability, reduction selection element 206 operates to select no directions in which to reduce the antenna pattern sensitivity, and thus all of the switches/transistors may be in a non-conducting state. In this situation the antenna may operate normally, that is operate such that it generates an antenna radiation pattern which is broadly constant in all directions around the z-axis, as illustrated in FIG. 4.

Figure 7A:
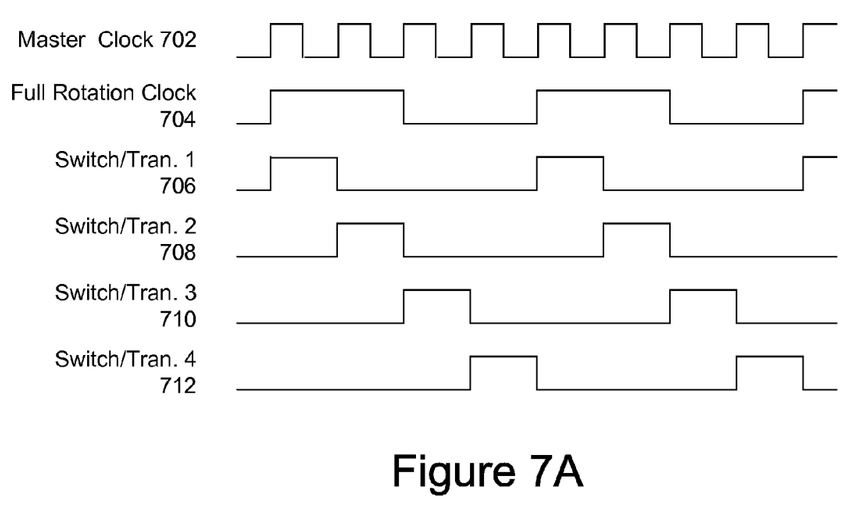
FIG. 7A is a diagram illustrating an exemplary set of clock signals that may be used by the direction estimation element and antenna system in implementing an embodiment of the present invention.
Figure 7B:
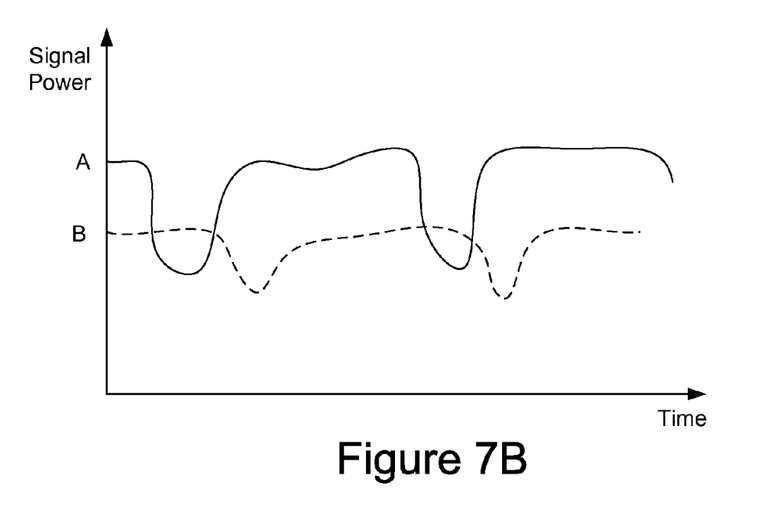
FIG. 7B is a diagram illustrating the received signal power for two wireless communication devices as a function of time.

The operation of the system when direction finding enable/disable signal 222 is set to enable one or more of the conductor elements 302, 303, 304, or 305 will now be illustrated with reference to FIG. 7A and FIG. 7B. FIG. 7A is a diagram illustrating an exemplary set of clock signals that may be used by the direction estimation element and antenna system in implementing an embodiment of the present invention. FIG. 7B is a diagram illustrating the received signal power for two wireless communication devices as a function of time.

FIG. 7A shows a Master Clock signal 702 at some nominal frequency, for example 100 Hz. The figure also shows the direction selection signal (for example, element 218 of FIG. 2), which according to one embodiment of the invention, consists of 4 sub-signals, one for each switch/transistor corresponding to each additional conductor/wire (labeled "Switch/Tran. 1 706", "Switch/Tran. 2 708", "Switch/Tran. 3 710", and "Switch/Tran. 4 712" in the figure). Each of the direction selection sub-signals is enabled once in every four cycles of the Master Clock, and only one direction selection sub-signal is enabled at any time. Thus, the direction in which the sensitivity of the antenna pattern is selectively reduced varies during a cycle of the Master Clock signal. The direction of reduced sensitivity of the pattern cycles or sequences through each of the directions corresponding to a position of the additional conductors/wires that are part of the antenna system (while the direction finding function is enabled, corresponding to direction finding enable/disable signal 222 of FIG. 2). In some embodiments, the Master Clock signal may be divided by the number of switches/transistors to generate a Full Rotation clock 704, that is a clock whose period is equal to the time taken for the sensitivity reduction to be rotated through a complete cycle.

In some embodiments, one or more of sub-signals 706, 708, 710, and 712 are provided to antenna system 202 as direction selection signal 218, and one or more of the sub-signals are provided to direction estimation element 210 as direction processing signal 220. In the antenna system, each sub-signal may be applied to a switch (which may be implemented in the form of a transistor) and function to control the switch so that it operates to connect and de-connect a conductor from the ground plane, thereby altering the antenna pattern. In the direction estimation element, the sub-signals may be used to approximate the direction of the peer wireless communication device with respect to the device containing the antenna system. This may be done by determining the direction that corresponds to the direction which, when the conductor in that direction is connected to the ground plane, causes the greatest reduction in signal strength.

In some embodiments, one or more of sub-signals 706, 708, 710, and 712 are provided to antenna system 202 as direction selection signal 218, and at least one of Master Clock signal 702 and Full Rotation Clock signal 704 are provided to direction estimation element 210 as direction processing signal 220. In the antenna system, each sub-signal may be applied to a switch (which may be implemented in the form of a transistor) and function to control the switch so that it operates to connect and de-connect a conductor from the ground plane, thereby altering the antenna pattern. In the direction estimation element, the Master Clock signal and/or Full Rotation Clock signal may be used to approximate the direction of the wireless communication device in a process based on the principle described above (i.e., by correlating a reduction in signal strength with a direction of a conductor which is grounded at a certain point in the clock signal).

Consider as an example of the use of an embodiment of the invention, two possible positions for wireless communication devices for which an estimated relative direction is desired to be determined (e.g., peer devices A and B): one at a distance along the X axis and a second at a distance along the Y axis, with each device transmitting at an approximately constant (although not necessarily the same) transmission power.

FIG. 7B is a diagram illustrating the received signal power for two wireless communication devices as a function of time. As shown in the figure, a reduction in the received signal power is seen for each of the wireless communication devices, but at a different clock cycle offset. As shown in FIG. 7B, signal A has a reduction in signal strength that occurs roughly at the same time as Switch 1 is enabled, while signal B has a reduction in signal strength that occurs roughly at the same time as Switch 2 is enabled. Switch 1 enables a conductor in one particular direction, while Switch 2 enables a conductor oriented approximately 90 degrees (in this embodiment) from that direction. Thus it can be inferred that signal A is from a device in approximately the same direction as the conductor that is enabled/disabled by Switch 1, and signal B is from a device in approximately the same direction as the conductor that is enabled/disabled by Switch 2. Based on the principles and underlying concept of the invention, the approximate direction of the signal source (e.g., a Bluetooth headset) relative to each peer device may therefore be determined based on the reduced received signal power.

In some embodiments or use cases, the approximate relative direction of a wireless communication device (e.g., a peer device) with respect to a device containing an embodiment of the invention may be determined by identifying a clock cycle (or other form of control signal) that is nearest the center of the reduction of the signal power received from that peer device, and correlating that clock cycle with the direction of an antenna element that is rendered inactive (e.g., grounded) by that clock cycle. In one implementation, the average received signal strength during the time when each of the sub-signals is selectively enabled may be measured. The sub-signal corresponding to the lowest signal strength (or that which displays the greatest amount of reduction from its baseline value) is then indicative of the direction of the wireless communication device relative to the device containing the invention. Thus, the approximate relative direction of the wireless communication device is inferred to be the direction of the conductor/wire which, when activated via the corresponding switch (the operation of which is controlled by the sub-signal), results in the lowest signal power received from the wireless communication device.

While having the benefit of a relatively low degree of computational complexity, this embodiment may produce a sub-optimal approximation to the relative direction. This is because the antenna sensitivity pattern is not perfectly concave and the precision of the direction determination is limited by the number of conductors/wires used. For example, where four additional conductors/wires are used, a maximum precision of 45 degrees is achieved. However, the maximum precision may be increased by increasing the number of additional conductors/wires, thereby providing an increased resolution as to the angular arc in which the direction of the transmitting device lies.

In some embodiments of the invention, the approximate direction of a wireless communication device (e.g., a peer device) may be determined by estimating the phase of the Master Clock (or Full Rotation Clock) corresponding to the lowest received signal power. For example, the received signal strength may be smoothed across a plurality (e.g., two or three or more) of consecutive sub-signals. The lowest signal strength in the smoothed signal may then be determined. The position of the lowest signal strength in the smoothed signal is then indicative of the direction of the wireless communication device. In one embodiment, this position may be expressed as the phase angle of the Master Clock (or Full Rotation Clock). For example, a peer device that is in the approximate direction of conductor 1 will show the greatest loss of signal strength when that conductor is enabled (i.e., connected to ground). However, a peer device that is in a direction approximately between conductor 1 and conductor 2 will show a reduction in signal strength when both of these conductors are enabled. If plotted as in FIG. 7B, it will be seen that this loss of signal strength corresponds to a shallower minimum extending to cover both the loss shown by signal A and by signal B. The center of this dip, i.e., the minimum, will correspond to a position between conductor A and conductor B, or to a point on the master clock equivalent to a phase shift of 45 degrees more than the phase of any one conductor signal.

Note that while having a relatively higher computational complexity than some embodiments, this embodiment produces a more precise and accurate approximation of the direction of a transmitting device since the number of possible directions (or angular regions) is not limited to the number of conductors/wires used.

In some embodiments of the invention, the approximate direction of a wireless communication device (e.g., a peer device) may be determined by determining the phase angle of the Master Clock signal (or Full Rotation Clock signal) that maximizes the correlation between a received signal strength and the direction selection signal. For example, the received signal strength may be smoothed across a plurality (e.g., two or three or more) of consecutive sub-signals. The correlation between the Full Rotation Clock signal and smoothed received signal strength may be determined at a plurality of phase angles of the Full Rotation Clock signal, where each phase angle of the Full Rotation Clock signal corresponds to a unique direction. The phase angle of the Full Rotation Clock signal that results in a maximum correlation between the Full Rotation Clock signal and the smoothed received signal strength may then be determined from the plurality of phase angles. The phase angle of the Full Rotation Clock signal having the maximum correlation indicates the approximate direction of the wireless communication device.

While having a relatively higher computational complexity than some embodiments, this embodiment results in a more precise and accurate approximation of the direction of a transmitting device since the number of approximated directions is not limited to the number of conductors/wires used and since other factors affecting the received signal strength (such as environmental noise, timing jitter, etc.) may be taken into consideration when processing the signals.

In some embodiments of the invention, the relative direction of a wireless communication device may be determined using other indicators of the performance of the communication link with the device (i.e., the direction may be determined using performance indicators other than a received signal strength or variations in that strength). For example, consider the situation where the wireless communication element is capable of communication using a Bluetooth protocol. The Bluetooth standard allows a user of a Bluetooth radio to measure the link-quality at frequent intervals, by means of the HCl command "Read Link Quality" as defined in the specification. While the link quality measurement technique and value is implementation-dependent, the link quality parameter is required to be monotonically increasing with link quality. Also, link quality generally varies approximately monotonically with receiver signal strength (i.e., stronger signals giving better link quality). Thus, the link quality measurement for a given peer device will vary monotonically with changes in receiver sensitivity.

In some embodiments, the approximate direction of the Bluetooth communication device (e.g., a portable Bluetooth headset) may be determined by estimating the clock cycle that is nearest the center of the lowest link quality measurement. In some embodiments, the approximate direction of the Bluetooth communication device may be determined by estimating the phase angle of the Master Clock signal (or Full Rotation Clock signal) corresponding to the lowest link quality measurement. In some embodiments, the approximate direction of the Bluetooth communication device may be determined by determining the phase angle of the Master Clock signal (or Full Rotation Clock signal) that maximizes the correlation between the link quality measurement and the Master Clock signal (or Full Rotation Clock signal).

It should be understood that a large number of antennas or types of antenna systems exist, including monopole, dipole, Yagi, patch, PIFA and the like (with each having one or more antenna elements), and that there are many methods of introducing directionally specific reductions in receiver sensitivity that may be used in implementing an embodiment of the invention. For example, for the case of using a dipole antenna, the directionally specific reductions in sensitivity may be introduced by use of dipole rather than monopole conductors being connected to ground (as in the above embodiment), with the other elements being similar. In the case of a Patch antenna, the corners of the patch may be designed so as to be either connected to the main patch or disconnected to the main patch by means of transistors. In such an embodiment, for normal operation, all corners would be connected to the main patch, giving a "full" normal patch antenna. Disconnecting each corner in turn, by turning off the relevant connecting transistor, would reduce the sensitivity in the disconnected direction.

The systems, apparatus, devices, and methods described herein have a wide range of applications; for example in the case where a cell phone user has misplaced their headset, embodiments of the invention may be used to determine in which direction the headset lies to assist the user in retrieving the headset. As another example, where a user of a headset wishes to pair with another device in a field of multiple devices, embodiments of the invention may be used to permit the user to point their device in the direction of the desired peer device in order to facilitate selection of the peer device. As another example, a game or contest in which different users challenge each other to perform a task may be played where such a game is designed to allow users to challenge other players in their vicinity that may not be known to them. In this instance, embodiments of the invention may be used to assist the users to find each other by pointing out the direction in which another user is located. The present invention may also be used with features of a social network or other form of group identification to enable members of a group to identify other members for purposes of coordinating movements, performing a task, etc.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

As used herein, the use of "a", "an" or "the" is intended to mean "at least one", unless specifically indicated to the contrary.

What is claimed is:
1. A system comprising:
an antenna system having an associated radiation pattern, the antenna system including
a ground plane,
a first conductor element having a first length that is a quarter-wavelength of a frequency of a wireless com- munication link and positioned at an origin of a coordinate system of the antenna system, and
a plurality of second conductor elements having the first length and spaced equidistantly from the origin by approximately the first length;
a plurality of switch elements configured to selectively introduce a null or other reduction in sensitivity into the associated radiation pattern by electrically connecting or disconnecting one or more of the plurality of second conductor elements, each subset of the one or more of the plurality of second conductor configured to introduce the null or other the reduction in sensitivity at different time intervals;
a communications link configure to monitor the performance of the wireless communication link between a first device associated with the antenna system and a second device, the first device and the second device communicating with each other using the wireless communication link; and
a correlation module configured to correlate a reduction in the performance of the wireless communication link with the null or other reduction in sensitivity at the different time intervals, and configured to provide an estimate of the direction of the second device relative to the first device.

2. The system of claim 1, wherein the antenna system comprises a monopole antenna system and the first conductor element, the plurality of second conductor elements or both comprise monopole elements.

3. The system of claim 1, wherein the antenna system comprises a dipole antenna system and the first conductor element, the plurality of second conductor elements or both comprise dipole elements.

4. The system of claim 1, wherein each switch element comprises a transistor.

5. The system of claim 1, wherein the first device is a mobile phone and the second device is a headset.

6. The system of claim 1, wherein the correlation module is configured to operate one or more of the plurality of switch elements to electrically connect or disconnect a base of one or more of the plurality of second conductor elements with the ground plane.

7. The system of claim 1, wherein the first conductor element, the plurality of second conductor elements or both have a perpendicular orientation to the ground plane.

8. The system of claim 1, wherein the plurality of second conductor elements are spaced around a circle approximately one-quarter wavelength in radius from the origin along the ground plane.

9. A method of determining a direction of a second device relative to a first device, comprising:
operating the first device so as to receive signals using an antenna system having an associated radiation pattern, the antenna system including
a ground plane,
a first conductor element having a first length that is a quarter-wavelength of a frequency of a wireless communication link and positioned at an origin of a coordinate system of the antenna system, and
a plurality of second conductor elements having the first length and spaced equidistantly from the origin by approximately the first length and,
a plurality of switch elements;
selectively introducing a null or other form of reduced sensitivity into the associated radiation pattern in a desired direction by operating subsets of one or more of the plurality of switch elements to electrically connect or disconnect a subset of one or more of the plurality of second conductor elements, each subset of the one or more of the plurality of second conductor elements configured to introduce the null or other the reduction in sensitivity at different time intervals;
monitoring the performance of the wireless communication link between the first device and the second device, the first device and the second device communicating with each other using the wireless communication link; and
correlating a reduction in the performance of the wireless communication link with the selectively introduced null or other form of reduced sensitivity at the different time intervals, thereby providing an estimate of the direction of the second device relative to the first device.

10. The method of claim 9, wherein the antenna system comprises a monopole antenna system and the first conductor element, the plurality of second conductor elements or both comprise monopole elements.

11. The method of claim 9, wherein the antenna system comprises a dipole antenna system and the first conductor element, the plurality of second conductor elements or both comprise dipole elements.

12. The method of claim 9, wherein each switch element comprises a transistor.

13. The method of claim 12, wherein the transistor is operated by a clock signal that is derived by dividing another clock signal by a number of switch elements in the plurality of switch elements.

14. The method of claim 9, wherein the first device is a mobile phone and the second device is a headset.

15. A mobile device operable to communicate with a second device using a wireless communications technology, comprising:
an antenna system having an associated radiation pattern operative to receive signals provided to the mobile device using the wireless communications technology the antenna system including
a ground plane,
a first conductor element having a first length that is a quarter-wavelength of a frequency of a wireless communication link and positioned at an origin of a coordinate system of the antenna system,
a plurality of second conductor elements having the first length and spaced equidistantly from the origin by approximately the first length, and
a plurality of switch elements;
a receiver coupled to the antenna system and operative to detect the received signals;
an antenna configuration module operative to selectively alter an aspect of the associated radiation pattern of the antenna system to cause a reduction in the performance of the antenna system by operating one or more of the plurality of switch elements to electrically connect or disconnect one or more of the plurality of second conductor elements at different time intervals;
a communications link monitoring module operative to monitor a signal characteristic of a signal exchanged between the second device and the mobile device; and
a correlation module operative to determine a correlation between a change in the signal characteristic and the selectively altered aspect of the associated radiation pattern of the antenna system at the different time intervals, thereby providing an estimate of the direction of the second device relative to the mobile device.

16. The mobile device of claim 15, wherein the reduction in the performance of the antenna system comprises selectively introducing a null or region of reduced sensitivity into the associated radiation pattern.

17. The mobile device of claim 15, wherein the antenna system comprises a monopole antenna system and the first conductor element, the plurality of second conductor elements or both comprise monopole elements.

18. The mobile device of claim 15, wherein the antenna system comprises a dipole antenna system and the first conductor element, the plurality of second conductor elements or both comprise dipole elements.

19. The mobile device of claim 15, wherein each switch element comprises a transistor.

20. The mobile device of claim 15, wherein the second device is a headset.

* * * * *